United States Patent
Yabusaki

(10) Patent No.: US 7,803,937 B2
(45) Date of Patent: Sep. 28, 2010

(54) CELLULOSE II PHOSPHATE ESTER AND METAL-ADSORBING MATERIAL USING THE SAME

(75) Inventor: Katsumi Yabusaki, Tsukuba (JP)

(73) Assignee: Kowa Co., Ltd., Nagoya-shi (JP)

( * ) Notice: Subject to any disclaimer, the term of this patent is extended or adjusted under 35 U.S.C. 154(b) by 0 days.

(21) Appl. No.: 10/576,468

(22) PCT Filed: Oct. 20, 2004

(86) PCT No.: PCT/JP2004/015501

§ 371 (c)(1), (2), (4) Date: Apr. 20, 2006

(87) PCT Pub. No.: WO2005/042587

PCT Pub. Date: May 12, 2005

(65) Prior Publication Data

US 2007/0093654 A1      Apr. 26, 2007

Related U.S. Application Data

(60) Provisional application No. 60/515,698, filed on Oct. 31, 2003.

(51) Int. Cl.
  C02F 1/62      (2006.01)
  C08B 15/06    (2006.01)
(52) U.S. Cl. .................. 536/34; 536/124; 210/687; 210/688
(58) Field of Classification Search ............. 536/30; 514/57
See application file for complete search history.

(56) References Cited

U.S. PATENT DOCUMENTS

| | | | | |
|---|---|---|---|---|
| 2,482,755 A | * | 9/1949 | Ford et al. | 8/192 |
| 3,634,183 A | * | 1/1972 | Viola et al. | 428/215 |
| 3,658,790 A | | 4/1972 | Bernardin | |
| 3,691,154 A | * | 9/1972 | Bernardin | 8/116.1 |
| 4,307,121 A | * | 12/1981 | Thompson | 426/431 |
| 4,851,120 A | * | 7/1989 | Reineke et al. | 210/500.25 |
| 4,981,515 A | * | 1/1991 | Hiraoka et al. | 106/18.12 |
| 6,579,977 B1 | * | 6/2003 | Pieschel et al. | 536/30 |
| 2005/0009153 A1 | | 1/2005 | Sugiyama et al. | |

FOREIGN PATENT DOCUMENTS

| | | |
|---|---|---|
| CA | 868344 | 4/1971 |
| JP | 60-210601 | 10/1985 |
| JP | 06-082435 | 3/1994 |
| JP | 10-298202 | 11/1998 |
| JP | 2001-522301 | 11/2001 |
| JP | 2003-225559 | 8/2003 |
| WO | WO 99/28372 * | 6/1999 |
| WO | WO 00/72940 A1 | 12/2000 |

OTHER PUBLICATIONS

Zeronian, S. et al "Phosphorylation of cellulose . . . " J. Appl. Polym. Sci. (1980) vol. 25, pp. 519-528.*
de Magalhaes Padilha et al "Preconcentration of heavy metals ions . . . " Talanta (1997) vol. 45, pp. 317-323.*
Kroon-Batenburg, L. et al "The crystal and molecular structures of cellulose I and II" Glycoconj. J. (1997) vol. 14, pp. 677-690.*
U.S. Appl. No. 11/080,628, filed Mar. 16, 2005, Sugiyama, et al.
U.S. Appl. No. 11/575,098, filed Mar. 12, 2007, Lu, et al.

* cited by examiner

*Primary Examiner*—Leigh C Maier
(74) *Attorney, Agent, or Firm*—Oblon, Spivak, McClelland, Maier & Neustadt, L.L.P.

(57) ABSTRACT

This invention relates to cellulose II phosphate which may be partly carbamidated, and also to a metal-adsorbing material making use of the same. This cellulose II phosphate efficiently adsorbs metal ions in a solution, and can be used as a metal-adsorbing material and in a metal-adsorbing system.

17 Claims, 5 Drawing Sheets

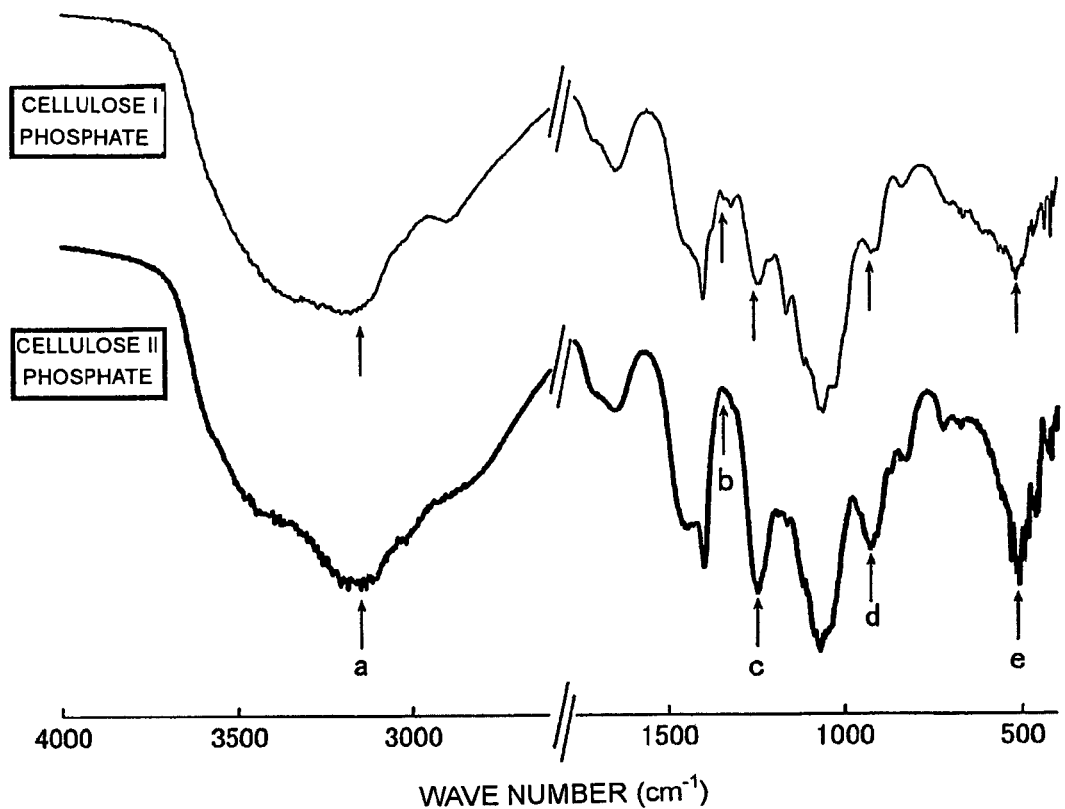
[Fig. 1]
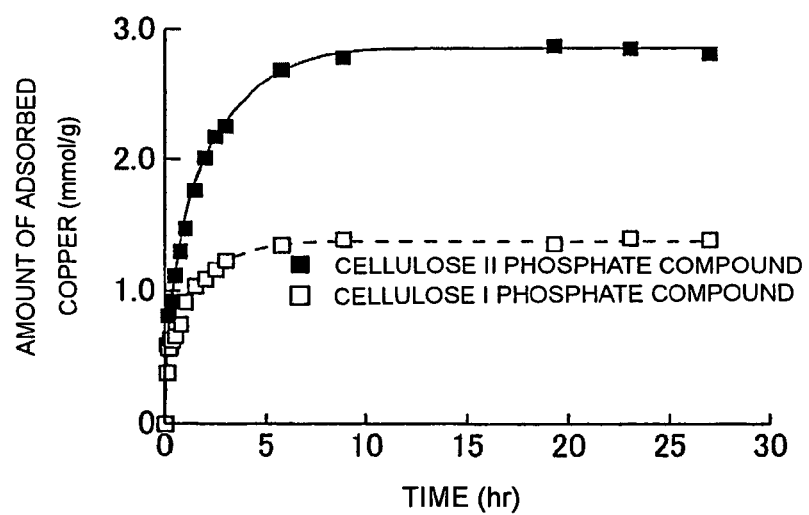
[Fig. 2]

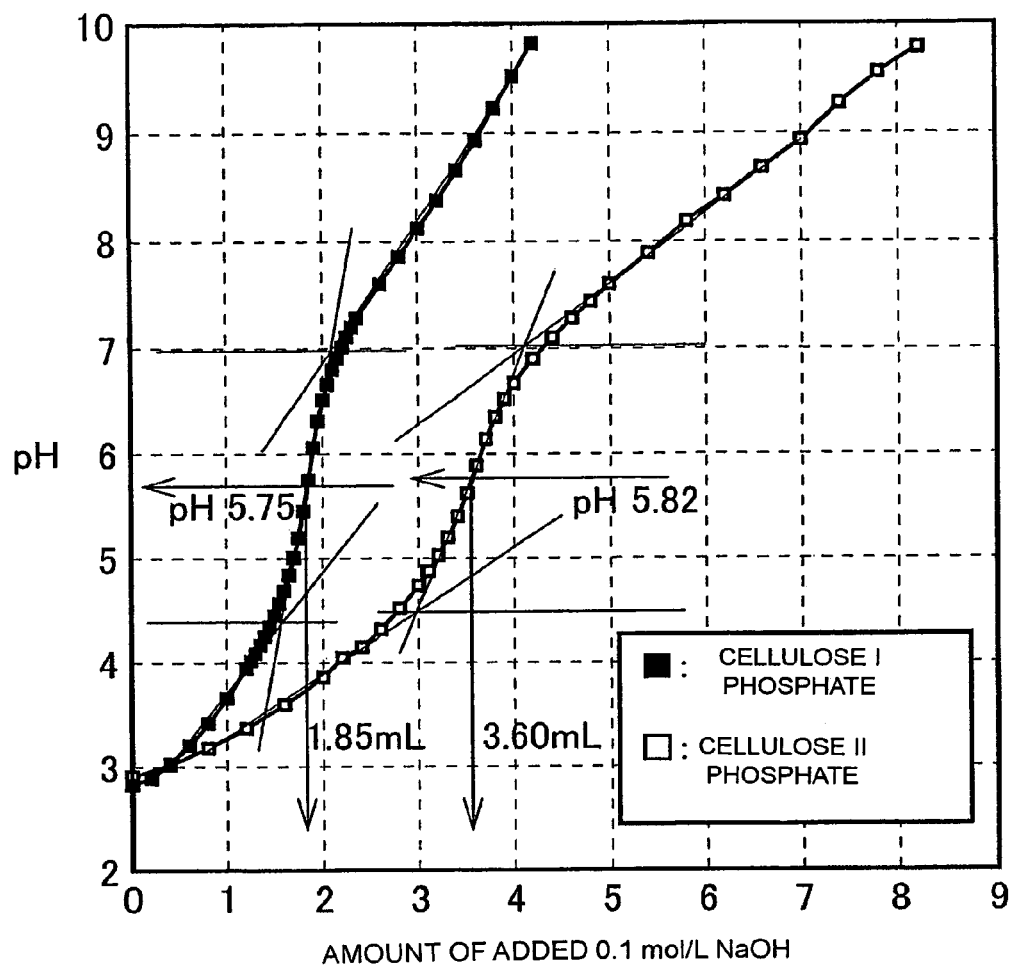

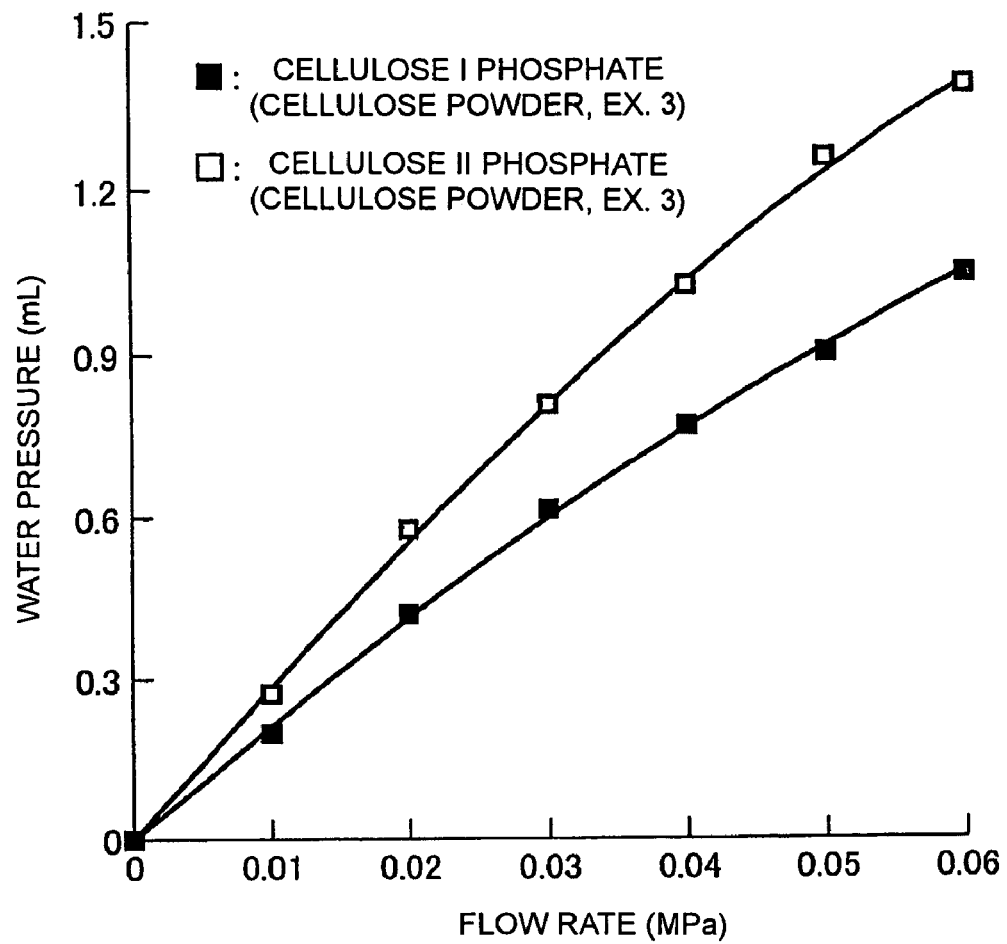

[Fig. 5]
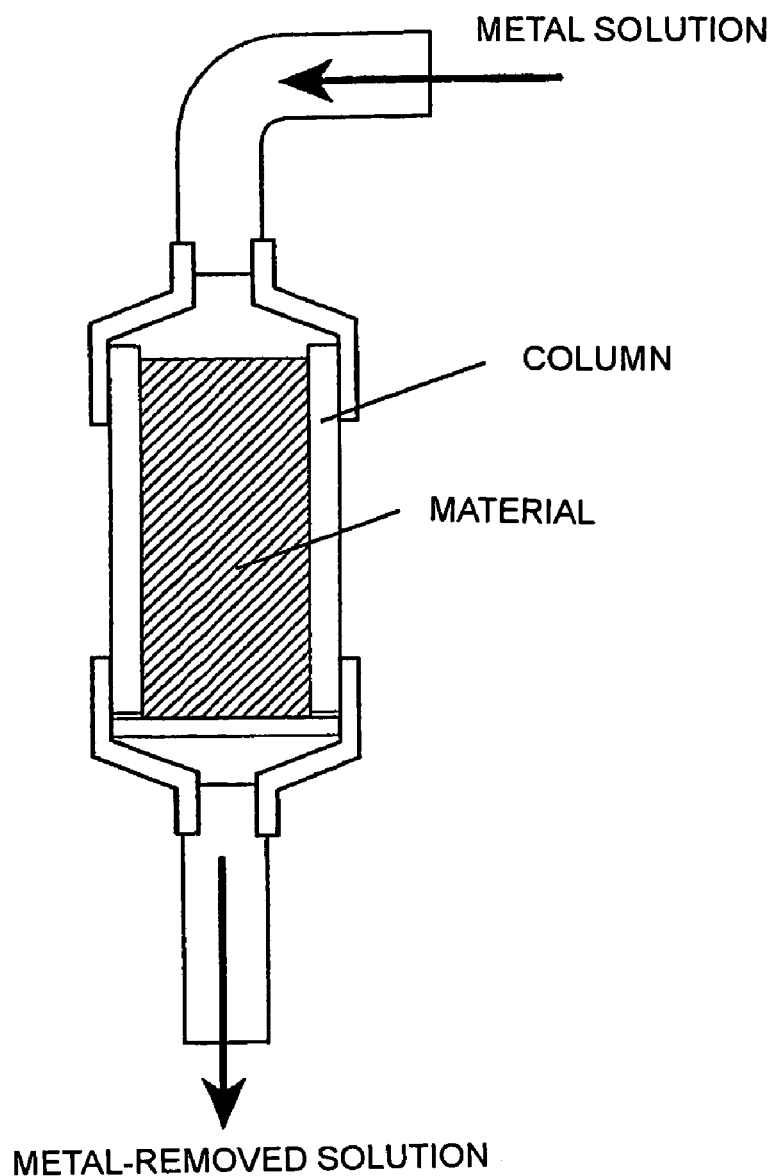

[Fig. 6]
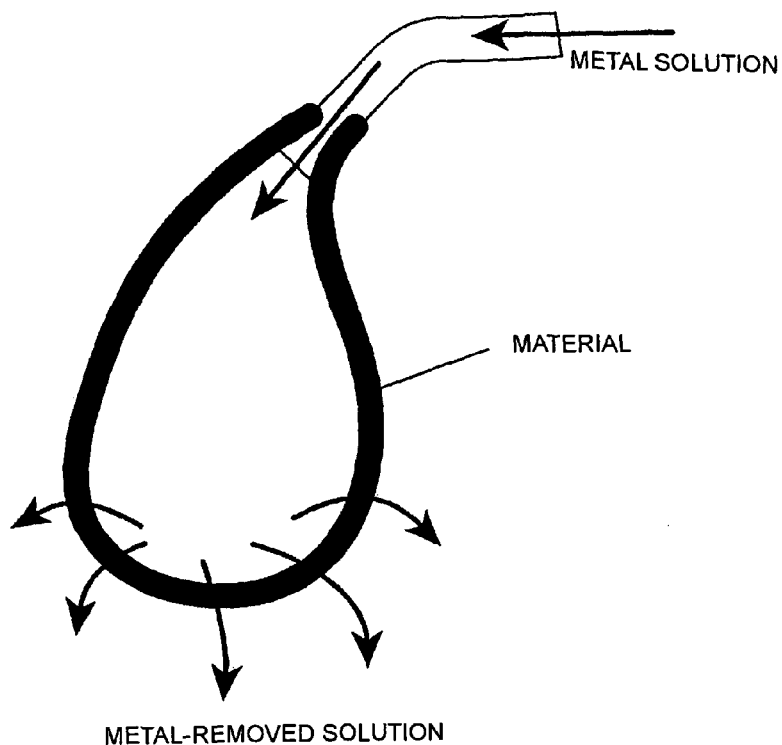
[Fig. 7]
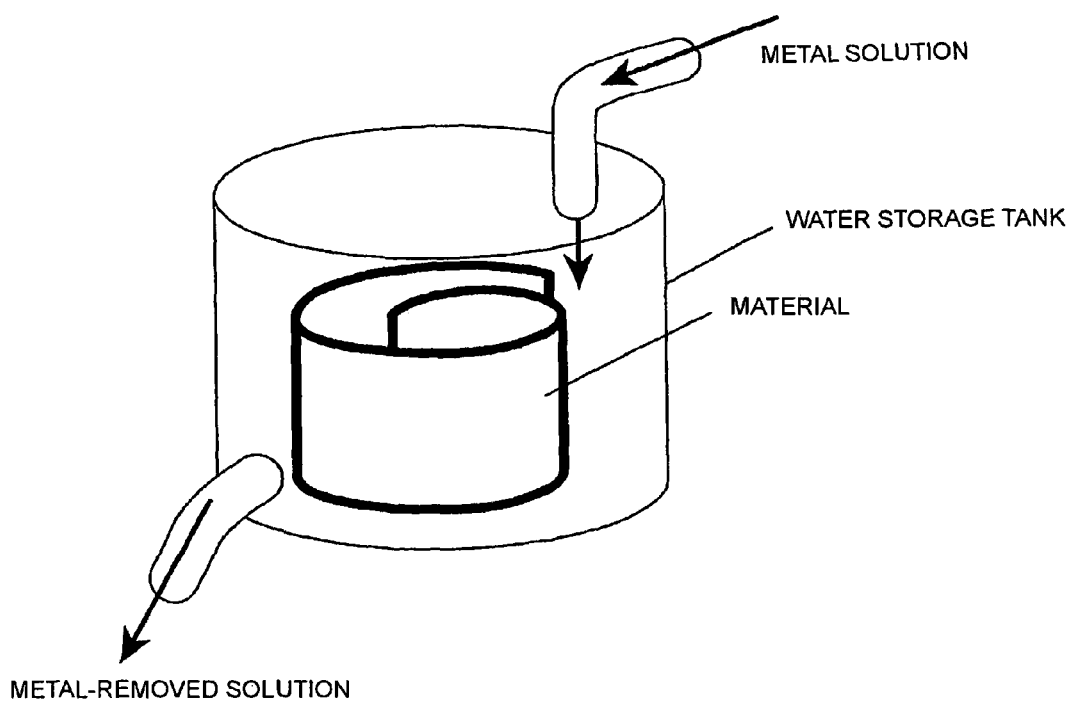

CELLULOSE II PHOSPHATE ESTER AND METAL-ADSORBING MATERIAL USING THE SAME

TECHNICAL FIELD

This invention relates to a phosphate ester derived from a natural material which is capable of efficiently adsorbing metal ions in a solution; its production process; a metal-adsorbing material making use of the phosphate ester; and a metal-adsorbing system making use of the metal-adsorbing material.

BACKGROUND ART

Known metal-adsorbing materials include; a materials such that metal-ion-adsorbing functional groups are chemically bound on a carrier by which they are immobilized, materials such that a low-molecular compound containing one or more of such functional groups and enclosed in a carrier to prevent its dissolution, and the like. These metal-adsorbing functional groups can be carboxyl groups, sulfonic groups, amino groups, thiol groups, phosphoric groups, or the like. The readily-adsorbable metal species differs depending on the kind of the metal-adsorbing functional groups, and sulfonic groups primarily adsorb monovalent metal ions such as potassium or sodium ions while carboxyl groups and phosphoric groups adsorb all metals including calcium and magnesium. Amino groups, imino groups and thiol groups are considered to show strong adsorption for heavy metals. Accordingly, the kind of metal-adsorbing functional groups to be used is selected depending on the metal species to be adsorbed.

A wide variety of carriers are also used, including vinyl resins such as styrene resin and acrylic resin, and as natural materials, cellulose (powder, fibers, gel), chitin, chitosan, wool and the like are in use. In the production of a metal-adsorbing material, the production is, in many instances, conducted subsequent to the introduction of one or more metal-adsorbing functional groups in a polymerizable monomer from the standpoint of ease in synthesis and uniformity in quality. Such metal-adsorbing materials are known as ion exchange resins or chelate resins. Chemical introduction of metal-adsorbing functional groups into natural materials such as cellulose or wood is also performed as those raw materials and also production costs are inexpensive.

The metal-adsorbing capacity of a metal-adsorbing material is also significantly affected by the shape of its raw material in addition to the chemical structure of the raw material. A resin is often formed into beads in view of its properties; however, it involves problems on the efficiency of treatment in that the content of the functional groups enclosed within the beads will be larger; the speed of diffusion of metal ions or a regenerant into the resin becomes low due to the hydrophobicity of the resin; and the lowest adsorbable concentration becomes high.

The manner of use of a metal-adsorbing material is also limited by the shape of its raw material. Upon treatment of water for the removal of a metal therefrom, a metal-adsorbing material with metal-adsorbing functional groups graft-polymerized on a resin-based raw material or a raw material cut into short pieces is limited to a method that the metal-adsorbing material is added into the water layer and subsequent to adsorption of the metal, the metal-adsorbing material is recovered by centrifugation or filtration; or to its use in a column. When the raw material has a small particle size, the filtration rate becomes low; therefore, such a raw material is not suited for the treatment of a great deal of water.

In the case of treatment for the removal or collection of a metal, especially the softening of water, the removal of a harmful metal from industrial wastewater, the removal of a harmful metal or the collection of a valuable metal from contaminated soil, or the like, the scale of an amount or area to be treated is enormous so that a large quantity of metal-adsorbing material will be necessary. The metal-adsorbing material to be used for these purposes is, therefore, desired to be high in adsorbing capacity; low in price; and reusable.

As metal-adsorbing functional groups, phosphoric groups have merits in that 1) one divalent metal ion can be adsorbed with a single phosphoric group and hence, more metals can be adsorbed, 2) they tend to liberate hydrogen ions on an acidic side and thus, the pH range of solutions from which metals can be adsorbed is broad, and 3) the lowest adsorpable metal ion concentration is low. As a carrier, on the other hand, cellulose has merits in that 1) the fibers themselves are highly durable, 2) its functional groups are mostly exposed on fiber surfaces, and 3) it has high formability.

For these merits, metal-adsorbing materials formed of natural materials as carriers containing phosphate ester groups have drawn interests. Known research includes, for example, use of cellulose phosphate for the removal of heavy metals and radioactive metals (Patent Document 1), a method for enhancing the mechanical strength of fibers by using sulfur powder upon production of cellulose phosphate (Patent Document 2), use of cellulose or starch phosphate, acetate or benzoate for the removal of heavy metals from water (Patent Document 3), and use of a filter, which is composed of cellulose having carbamido groups and phosphate ester groups, for the removal of hardening components or heavy metals from drinking water (Patent Document 4).

They are, however, not sufficient from the standpoint of metal-adsorbing capacity or economy, leading to an outstanding strong desire for the development of an economical metal-adsorbing material with still better metal-adsorbing capacity, metal-reacting velocity, mechanical strength, formability, application range, reusability and so on.

Cellulose exists in four polymorphs ranging from polymorph I, which is a natural cellulose, to polymorph IV. Cellulose I phosphate available from the phosphorylation of natural cellulose is known as described above, but the phosphorylation product of cellulose II is not known.

Patent Document 1: RU-C1-2096082
Patent Document 2: WO-A1-99028372
Patent Document 3: DE-A1-19859746
Patent Document 4: JP-A1-2003-500199

DISCLOSURE OF THE INVENTION

Objects to be Achieved by the Invention

Objects of the present invention are to provide a metal-adsorbing compound which is excellent in the adsorbing capacity; adsorbing rate for metal ions in a solution; mechanical strength; formability; having broad application range and superb reusability, its production process, a metal-adsorbing material making use of the same, and a metal-adsorbing system making use of the adsorbing material.

Means for Achieving the Objects

The present inventors have proceeded with an extensive investigation to achieve the above-described objects. As a result, it has been found that novel cellulose II phosphate available from cellulose II as a raw material has higher metal-adsorbing capacity and water permeability than conventionally-known cellulose I phosphate, and moreover, is reusable. In addition, it has also been found that advance adsorption of a metal on cellulose II phosphate makes it useful as an adsorbing material for anions such as arsenite ions or fluorine ions.

Described specifically, the present invention provides a cellulose II phosphate compound which may be partly carbamidated (converted into the aminomethanoate ester structure).

Further, the present invention also provides a process for producing cellulose II phosphate which may be partly carbamidated, which comprises reacting a phosphorus oxide, a phosphoric acid halide, or a phosphoric acid or a salt thereof to cellulose II which may be partially carbamidated.

Furthermore, the present invention also provides a metal-adsorbing material comprising cellulose II phosphate which may be partly carbamidated and a metal-adsorbing system comprising the metal-adsorbing material.

Still furthermore, the present invention also provides an anion-adsorbing material comprising a metal salt of cellulose II phosphate which may be partly carbamidated.

ADVANTAGEOUS EFFECTS

Cellulose II phosphate which may be partly carbamidated, to which the present invention relates, is a metal-adsorbing material having high metal-adsorbing capacity and metal-adsorbing rate per unit weight, and moreover, is excellent in water permeability, is superb in softening effect for water and the like, permits extremely effective removal of heavy metals from effluents, is excellent in formability and can be formed into various shapes, has a broad application range, and can be readily reused.

BRIEF DESCRIPTION OF THE DRAWINGS

FIG. 1 A diagram showing infrared absorption spectra of cellulose II phosphate and cellulose I phosphate.

FIG. 2 A diagram illustrating the results of a comparison between time-dependent changes in the amounts of a metal (copper) adsorbed at pH 4.73 on cellulose phosphate according to the present invention and cellulose I phosphate, respectively.

FIG. 3 A diagram depicting neutralization titration curves of cellulose phosphate according to the present invention and cellulose I phosphate.

FIG. 4 A diagram showing the water permeability of cellulose II phosphate according to the present invention.

FIG. 5 A view illustrating a metal-adsorbing system with the metal-adsorbing material according to the present invention as packed in a column.

FIG. 6 A view depicting a metal-adsorbing system comprising the metal-adsorbing material according to the present invention as formed in the shape of a bag.

FIG. 7 A view showing a metal-adsorbing system with a metal-adsorbing material according to the present invention as arranged inside a water storage tank.

BEST MODE FOR CARRYING OUT THE INVENTION

The phosphate ester according to the present invention is not cellulose I phosphate, but is cellulose II phosphate. It is known that ordinary natural cellulose is cellulose I and that, when this cellulose I is treated with an alkali, liquid ammonia or glycerol, it is converted into cellulose II, cellulose III or cellulose IV, respectively. Among these polymorphs, cellulose II is used as a raw material in the present invention.

Cellulose II phosphate which may be partly carbamidated, to which the present invention relates, can be produced by reacting a phosphorus oxide, a phosphoric acid halide, or a phosphoric acid or a salt thereof either singly or in combination to cellulose II which may be partly carbamidated.

Cellulose II useful as a raw material in the present invention can also be produced by treating cellulose I with an alkali such that it is transformed in crystal form. Alkalis usable in this treatment can include alkali metal hydroxides such as potassium hydroxide and sodium hydroxide; alkali metal carbonates such as sodium carbonate, sodium hydrogencarbonate and potassium carbonate; alkanolamines such as triethanolamine; and ammonia, with alkali metal hydroxides being preferred. An alkali may be added preferably in a proportion of from 0.0005 to 1 mole, more preferably in a proportion of from 0.002 to 0.25 mole per gram of cellulose I. Use of an aqueous alkaline solution is preferred for the reaction, and the concentration of an aqueous alkaline solution to be used may be preferably from 0.5 to 10 mol/L, more preferably from 2 to 10 mol/L. The reaction temperature may range preferably from −20 to 150° C., more preferably from 4 to 130° C., while the reaction time may range preferably from 0.1 to 50 hours, more preferably from 1 to 30 hours.

As the raw material, cellulose II, it is also possible to use a cellulose II material obtained by treating a natural cellulose material, which is available in various forms, with an alkali. Such natural cellulose materials can include microcrystalline cellulose, cellulose fibers obtained by treating cotton, wood-based pulp, kenaf, hemp or the like, absorbent cotton, cotton linters, cotton yarns, knitted cotton fabric, woven cotton fabric, filter paper, small wood chips, and coarse saw dust.

Phosphorus oxides and phosphoric acid halides usable for the phosphorylation of cellulose II can include phosphorus trioxide, phosphorus tetroxide, phosphorus pentoxide, phosphorus oxychloride, and phosphorus oxybromide. Usable phosphoric acids can include metaphosphoric acid, pyrophosphoric acid, orthophosphoric acid (which may be referred to simply as "phosphoric acid"), triphosphoric acid, and tetraphosphoric acid. Usable salts can include ammonium salt, alkanolamine salts, and alkali metal salts. Specific examples include diammonium hydrogenphosphate, ammonium dihydrogenphosphate, potassium dihydrogenphosphate, dipotassium hydrogenphosphate, sodium dihydrogenphosphate, and disodium hydrogenphosphate. Among these phosphorus oxides, phosphoric acid halides, phosphoric acids and salts, phosphorus oxychloride, phosphoric acid, diammonium hydrogenphosphate, and the like are preferred.

As the ratio of cellulose II to the phosphorus oxide, the phosphoric acid halide, or the phosphoric acid or the salt thereof upon their reaction, the phosphorus oxide, the phosphoric acid halide, or the phosphoric acid or the salt thereof can be reacted preferably in a proportion of from 0.0007 to 0.06 mole, more preferably in a proportion of from 0.003 to 0.04 mole to every gram of cellulose II. The reaction temperature may range preferably from 100 to 300° C., more preferably from 120 to 220° C., while the reaction time may range preferably from 0.5 to 8 hours, more preferably from 1 to 4 hours.

To obtain cellulose II phosphate which is partly carbamidated, it is only necessary to convert cellulose II, in which some of hydroxyl groups as cellulosic residual groups have been carbamidated, into its phosphate ester under similar conditions as described above. Cellulose II which is partly carbamidated can be obtained, for example, by reacting urea to cellulose II. Cellulose II phosphate which is partly carbamidated can also be produced by allowing urea to coexist upon reacting cellulose II into its phosphate ester. For the carbamidation, urea may be used preferably in a proportion of from 0.005 to 0.3 mole, more preferably in a proportion of from 0.02 to 0.15 mole per gram of cellulose II. After the reaction, regular washing with water and subsequent drying can be carried out.

When the phosphorylation is conducted using the cellulose II material as a raw material, cellulose II phosphate is obtained while retaining the form of a knitted fabric, a woven fabric or the like as described above. When the phosphorylation is conducted by using cellulose II which is partly carbamidated or by allowing urea to coexist with cellulose II, cellulose II phosphate which is partly carbamidated is obtained. It is to be noted that the degree of phosphorylation may be preferably from 3 to 20% (weight percentage) in terms of phosphorus content, especially from 8 to 20% (weight percentage) in terms of phosphorus content from the standpoint of metal-adsorbing capacity.

The degree of carbamidation of cellulose II phosphate which may be partly carbamidated may preferably be from 0 to 6.8% (weight percentage) in terms of nitrogen content.

Cellulose II phosphate according to the present invention contains phosphoric groups as metal-adsorbing functional groups, and is superior in metal-adsorbing property to metal-adsorbing materials of the cation exchange resin type having carboxyl groups or sulfonic groups as adsorptive functional groups. Described specifically, hydroxyl groups in carboxyl groups as weakly-acidic, cation-exchanging functional groups dissociate in an alkaline to mildly acidic range; therefore, carboxyl groups cannot adsorb metal ions in an acidic solution, while sulfonic groups adsorb primarily monovalent salts such as sodium and potassium and hardly adsorb divalent metal ions. Further, a single divalent metal ion is adsorbed with two cation-exchanging functional groups, and therefore cation-exchanging functional groups are accompanied by problems in that 1) the adsorption rate is slow and 2) the adsorbing capacity per unit weight is low. Many of metal-adsorbing materials called "chelate resins", on the other hand, contain two or more electrons as lone pair(s) on a nitrogen atom, and have a merit in that they are limited to the adsorption of heavy metals among divalent metal ions and do not adsorb alkaline earth metals such as calcium and magnesium. This merit, however, leads to a demerit that they cannot be used for the softening treatment of water, the objective of which is to remove calcium and magnesium.

However, the metal-adsorbing functional groups in cellulose II phosphate according to the present invention are phosphoric groups, each of which contains two mutually-adjacent hydroxyl groups and can by itself adsorb a single divalent metal ion. Therefore, cellulose II phosphate has a high adsorption rate, and moreover, can remove metal ions even in acidic solutions as phosphoric groups allow the dissociation of hydrogen atoms from the functional groups even in the acidic range. Moreover, cellulose II phosphate can adsorb monovalent alkali metals, divalent alkaline earth metals and transition metals irrespective of their species, and therefore, can be applied not only to the softening treatment of water but also to the treatment of effluent for the purpose of removal of heavy metals and further to a combination of both of these treatments.

As will be demonstrated in Examples to be described subsequently herein, cellulose II phosphate according to the present invention is surprisingly equipped with metal-adsorbing capacity superior to cellulose I phosphate. Cellulose II phosphate according to the present invention is also superior in water permeability to cellulose I phosphate. Moreover, cellulose II phosphate according to the present invention is also good in reusability. These advantages mean that compared with cellulose I phosphate, cellulose II phosphate according to the present invention is excellent as a material for adsorbing metals in aqueous solutions, that is, as a metal-adsorbing material.

Cellulose II phosphate according to the present invention adsorbs only cations. However, its metal salt obtained by reacting metal ions beforehand to cellulose II phosphate can be used as an anion-adsorbing material. The metal ions can be trivalent or higher cations such as iron ions, aluminum ions, chromium ions, selenium ions, tin ions and lanthanum ions. Adsorbable anions, on the other hand, can include fluorine ions, chlorine ions, bromine ions, iodine ions, borofluorate ions, arsenite ions, selenite ions, cyanate ions, thiocyanate ions, and nitrate ions. It is to be noted that a metal salt of cellulose II phosphate can be produced by reacting a metal halide or the like to cellulose II phosphate which may be partly carbamidated. Like cellulose II phosphate, the metal salt of cellulose II phosphate can be formed into the below-described various shapes, and can be arranged in anion-adsorbing systems of various forms.

Cellulose II phosphate according to the present invention, which uses as a raw material cellulose II material derived from a natural material, is in the form of knitted fabric, woven fabric, nonwoven fabric, aggregates, powder, paper, yarns, fibers, cotton wool or the like, and therefore, is extremely good in formability and is suited for use as a metal-adsorbing material. The metal-adsorbing capacity of the metal-adsorbing material is significantly affected not only by the kind of its adsorptive functional groups but also its shape, and the metal-adsorbing material according to the present invention may preferably be in the form of knitted fabric, woven fabric, non-woven fabric, paper, yarns, fibers or cotton wool. When a woven fabric or nonwoven fabric of cellulose II fibers is phosphorylated, for example, phosphoric groups concentrate on the surfaces of the cellulose II fibers, thereby preferably excluding various factors affecting the adsorbing capacity, such as particle size and moisture permeability, as observed in the case of cation-exchange resin beads. Further, a knitted fabric or woven fabric of cellulose II fibers allows a solution to come into contact with phosphoric groups on the fibers and adsorbs metals in the solution while allowing the solution to permeate at the portions of its meshes, and is equipped with mechanical strength at portions located around the meshes and formed of fibers stacked together. Even in the treatment of water under an application of water pressure, the knitted fabric or woven fabric of cellulose II fibers can, therefore, be used for the high-speed filtration of the water without destruction of its material. When filtering a liquid at a high speed, it is generally required either to increase the fiber diameter or to enlarge the meshes of the knitted fabric or woven fabric. However, the selection of fast-adsorbing phosphoric groups as metal-adsorbing functional groups and the use of cellulose II formed in the shape of a knitted fabric or woven fabric as their support make it possible to perform chemical and physical, high-speed water treatment.

As has been described above, cellulose II phosphate according to the present invention is good not only in metal-adsorbing capacity, water permeability and reusability but also the formability into various forms and mechanical strength, and therefore, is useful as a metal-adsorbing material having a wide application range.

The metal-adsorbing material according to the present invention, which contains cellulose II phosphate, can be arranged in metal-adsorbing systems of various forms by making use of its superb metal-adsorbing capacity. Illustrative are a metal-adsorbing system with the metal-adsorbing material according to the present invention as packed in a column (FIG. 5); a metal-adsorbing system comprising the metal-adsorbing material according to the present invention as formed in the shape of a bag (FIG. 6); and a metal-adsorbing system with a metal-adsorbing material according to the present invention as formed in the form of a cylinder or fabric and arranged inside a water storage tank (FIG. 7).

EXAMPLES

The present invention will hereinafter be specifically described based on Examples. It should, however, be borne in mind that the present invention is not limited to these Examples.

Measuring Method of the Amount of Adsorbed Metal

The amount of a metal adsorbed on a metal-adsorbing material was measured by the following measuring method.

The metal-adsorbing material (W g), which was optionally cut into small pieces as needed, was added to an 10 mmol/L aqueous solution (V L) of the metal, followed by thorough dispersion. After the thus-obtained mixture was stirred at room temperature (25° C.) for 24 hours, an aliquot (0.5 mL) of the aqueous solution was collected in a 1.5-mL Eppendorf centrifugal tube, and was then centrifuged at 12,000 r/min (rotor diameter: approx. 9 cm) for 10 minutes to have the powder precipitated, thereby obtaining its supernatant. An aliquot (X mL) of the supernatant was sampled, 0.1 mol/L nitric acid (Y mL) was added to dilute the supernatant at a D-fold dilution rate [=(X+Y)/X], and the concentration (C1) of the metal in the solution was measured by atomic adsorption spectrometry. In addition, the concentration (C0) of the metal in the aqueous solution to which the metal-adsorbing material was not added was also measured likewise. By the following equation, the amount (Ad mmol/g) of the metal adsorbed per gram of the cellulose phosphate compound was calculated.

$Ad = (C0 - C1) \times D \times V/W$

Production Example

Production of Cellulose II by High Alkali Treatment (1) A 10 mol/L aqueous solution of sodium hydroxide (100 mL) was added to natural cellulose powder (cotton linters; 10 g), followed by stirring at room temperature (25° C.) for 2 hours. The mixture was then washed with water to remove the alkali, water was removed by filtration, and the residue was dried at 70° C. for 6 hours to afford a cellulose II material A.

(2) A 10 mol/L aqueous solution of sodium hydroxide (20 mL) was poured over a cotton fabric (terry cloth; dry weight: 10 g) spread in a glass container to soak the cotton fabric with the aqueous solution, and the soaked cotton fabric was then allowed to stand at room temperature (25° C.) for 2 hours. Subsequently, the cotton fabric was washed with water to remove the alkali, wringed well to remove water, and then dried at 70° C. for 6 hours to afford a cellulose II material B.

(3) A 10 mol/L aqueous solution of sodium hydroxide (50 mL) was added to natural cellulose fibers (ramie) cut in approx. 3 cm lengths, followed by stirring at room temperature (25° C.) for 2 hours. Subsequently, the natural cellulose fibers were washed with water to remove the alkali, wringed well to remove water, and then dried at 70° C. for 6 hours to afford a cellulose II material C.

Example 1

(1) A phosphorylating chemical solution, which had been prepared by dissolving phosphoric acid (0.015 mol), diammonium hydrogenphosphate (0.02 mol) and urea (0.1 mol) in water (15.0 mL), was added to the cellulose II material C (1 g). The thus-prepared mixture was thoroughly mixed, was allowed to stand at room temperature (25° C.) for 1 hour, and then, was completely dried at 90° C. for 6 hours. Subsequently, the mixture was heated to 150° C., followed by a reaction at that temperature for 2 hours. The reaction product was then washed with water and dried (at 70° C.) to afford cellulose II phosphate (fibers).

(2) The thus-afforded cellulose II phosphate, cellulose I phosphate afforded by phosphorylating natural cellulose fibers (ramie), and their raw materials, i.e., cellulose II and cellulose I (natural cellulose fibers (ramie)), respectively, were each subjected to an elemental analysis. The following results were obtained.

| | |
|---|---|
| Cellulose II phosphate: | C 22.01%, H 4.86%, N 2.65%, P 14.6% |
| Cellulose I phosphate: | C 34.35%, H 5.61%, N 1.34%, P 6.6% |
| Cellulose II: | C 43.14%, H 6.43% |
| Cellulose I: | C 43.56%, H 6.30% |

(3) Infrared absorption spectra of the thus-afforded cellulose II phosphate and cellulose I phosphate are shown in FIG. 1. From FIG. 1, they are clearly different from each other in that cellulose II phosphate has absorption peaks around 3180 $cm^{-1}$, 1250 $cm^{-1}$, 940 $cm^{-1}$ and 520 $cm^{-1}$ and the absorption intensity of a peak around 1355 $cm^{-1}$ is reduced compared to cellulose I phosphate.

(4) The amount of a metal (copper) adsorbed on the thus-afforded cellulose II phosphate was compared with those of cellulose I phosphate, a chelate resin and an ion exchange resin. The measurement results of the amounts of the metal adsorbed at the $5^{th}$ hour that an adsorption equilibrium had not been reached yet and at the $24^{th}$ hour that an adsorption equilibrium had been already reached are shown in Table 1 ($5^{th}$ hour) and Table 2 ($24^{th}$ hour).

Cellulose II phosphate according to the present invention was high in adsorption rate, and had excellent metal-adsorbing property.

TABLE 1

| Materials | Amounts of adsorbed metal (copper) (mmol/g) | pHs of solutions |
|---|---|---|
| Cellulose II phosphate | 3.58 | 5.82 |
| Cellulose I phosphate [1] | 1.82 | 5.82 |
| Chelate resin (CR-20) [2] | 0.60 | 5.82 |
| Ion exchange resin (WK-40) [3] | 1.45 | 7.21 |

TABLE 2

| Materials | Amounts of adsorbed metal (copper) (mmol/g) | pHs of solutions |
|---|---|---|
| Cellulose II phosphate | 3.79 | 5.82 |
| Cellulose I phosphate *[1] | 1.86 | 5.82 |
| Chelate resin (CR-20) *[2] | 0.80 | 5.82 |
| Ion exchange resin (WK-40) *[3] | 2.31 | 7.21 |

Note)
*[1] Cellulose I phosphate afforded by phosphorylating natural cellulose powder (ramie) which had not been subjected to any alkali treatment.
*[2] Product of Mitsubishi Chemical Corporation
*[3] Product of Mitsubishi Chemical Corporation (5) By changing the time of contact at pH 4.73 between the above-afforded cellulose II phosphate and an aqueous solution of copper chloride, time-dependent changes of the amount of the adsorbed metal were measured. The results are shown in FIG. 2. Further, the measurement results of adsorbed amounts of other metals are shown in Table 3.

It is appreciated that for heavy metals and alkaline earth metals, cellulose II phosphate has approximately twice as much metal-adsorbing capacity as cellulose I phosphate.

TABLE 3

| | Maximum adsorbed amount (mmol/g) | | |
|---|---|---|---|
| Metal species | Cellulose I phosphate | Cellulose II phosphate | Initial pH |
| Heavy metals | | | |
| Chromium | 1.02 | 2.05 | 3.14 |
| Nickel | 0.91 | 1.80 | 7.33 |
| Zinc | 1.39 | 2.78 | 6.15 |
| Cadmium | 1.46 | 2.81 | 5.74 |
| Lead | 1.70 | 3.38 | 4.95 |
| Alkaline earth metals | | | |
| Calcium | 1.50 | 3.08 | 5.83 |
| Magnesium | 1.23 | 2.45 | 6.14 |

(6) Neutralization titration curves determined with respect to the thus-afforded cellulose II phosphate and cellulose I phosphate are shown in FIG. 3.

Example 2

In a similar manner as in the production of cellulose II material B, a cotton fabric was spread in a glass container and the same phosphorylating chemical solution as that employed in Example 1 was poured to soak the cotton fabric with the phosphorylating chemical solution. A phosphorylating reaction was then conducted in a similar manner as in Example 1 to afford a cellulose II phosphate material (knitted fabric).

The amount of a metal (copper) adsorbed on the thus-afforded cellulose II phosphate was 1.39 (mmol/g) at pH 4.73 and hence, was excellent, while that of cellulose I phosphate afforded by phosphorylating an alkali-untreated cotton fabric was 1.18 mmol/g.

Example 3

A phosphorylating chemical solution, which had been prepared by dissolving phosphoric acid (0.015 mol), diammonium hydrogenphosphate (0.020 mol) and urea (0.1 mol) in water (15.0 mL), was added to the cellulose II material A (1 g). The thus-prepared mixture was thoroughly mixed, was allowed to stand at room temperature (25° C.) for 1 hour, and then, was completely dried at 90° C. for 6 hours. Subsequently, the mixture was heated to 150° C., followed by a reaction at that temperature for 2 hours. The reaction product was then washed with water and dried (at 70° C.) to afford cellulose II phosphate (powder).

The amount of a metal (copper) adsorbed on the thus-afforded cellulose II phosphate material (powder) was 2.32 (mmol/g) at 4.73 and hence, was excellent, while that of cellulose I phosphate afforded by phosphorylating natural cellulose powder was 1.76 mmol/g.

Example 4

In a similar manner as in the production of cellulose II material B, a cotton fabric was spread in a glass container and the same phosphorylating chemical solution as that employed in Example 3 was poured to soak the cotton fabric with the phosphorylating chemical solution. A phosphorylating reaction was then conducted in a similar manner as in Example 3 to afford cellulose II phosphate.

The amount of a metal (copper) adsorbed on the thus-afforded cellulose II phosphate was 1.74 (mmol/g) at pH 4.73 and hence, was excellent, while that of cellulose I phosphate afforded by phosphorylating a similar cotton fabric itself was 1.30 mmol/g.

Example 5

Phosphorus oxychloride (0.18 mol) was added to the cellulose II material A (1 g). The thus-obtained mixture was heated to 65° C., at which they were thoroughly stirred and reacted. Water (1 mL) was added further, and the phosphorus oxychloride reacted with the cellulose was subjected to dechlorination to afford cellulose II phosphate.

The amount of a metal (copper) adsorbed on the thus-afforded cellulose II phosphate was 1.80 (mmol/g) at pH 4.73 and hence, was excellent, while that of cellulose I phosphate afforded by phosphorylating natural cellulose powder (cotton linters) was 1.50 mmol/g.

Example 6

Water Permeability

The results of a comparison in permeability between the cellulose II phosphate material (Example 3) and cellulose I phosphate are shown in FIG. 4.

Measurement of Permeability

Each metal-adsorbing material (1 g) was packed in a column of 1 cm$^2$ in cross-sectional area, and the flow rate of column effluent was measured with the water pressure varied from 0 to 0.06 MPa.

The water permeability of cellulose II phosphate was excellent compared with that of cellulose I phosphate.

Example 7

The cellulose II phosphate (10 g) afforded in Example 3 was placed in a 0.1 M aqueous solution of aluminum chloride (100 mL, pH 3.02), and the thus-obtained mixture was shaken at 25° C. for 1 day. Subsequently, the mixture was thoroughly washed with water (1 L), and was dried at 50° C. The material (0.01 g) was placed in a 100 ppm aqueous solution of sodium fluoride (100 mL, pH 6 to 7), followed by shaking at 25° C. for 24 hours to react them such that fluorine ions were adsorbed on the material. Fluorine ions in a supernatant, which had been obtained by centrifuging the recovered solution, were measured by ion chromatography, and from the fluorine ion concentrations before and after the reaction, the amount of adsorbed fluorine ions was determined. The amount of fluorine ions adsorbed on cellulose II phosphate, on which aluminum ions had been adsorbed, was 1.14 mmol/g per gram of the material.

Example 8

The cellulose II phosphate (10 g) afforded in Example 3 was placed in a 0.1 M aqueous solution of ferric chloride (100 mL, pH 1.66, and the thus-obtained mixture was shaken at 25° C. for 1 day. Subsequently, the mixture was thoroughly washed with water (1 L), and was dried at 50° C. The material (0.05 g) was placed in a 5 mM aqueous solution of potassium arsenite (30 mL, pH 10.01), followed by shaking at 25° C. for 24 hours to react them such that arsenite ions were adsorbed on the material. Arsenite ions in a supernatant, which had been obtained by centrifuging the recovered solution, were measured by inductively coupled plasma (ICP), and from the arsenite ion concentrations before and after the reaction, the amount of adsorbed arsenite ions was determined. The amount of arsenite ions adsorbed on cellulose II phosphate, on which iron ions had been adsorbed, was 0.3 mmol/g per gram of the material.

The invention claimed is:

1. A carbamidated cellulose II phosphate, wherein said cellulose II phosphate has a degree of phosphorylation of from 3 to 20 wt % in terms of phosphorus content, and which is produced by reacting a phosphorus oxide, a phosphoric acid halide, or a phosphoric acid or a salt thereof with a dried cellulose II in the presence of urea.

2. The carbamidated cellulose II phosphate according to claim 1, which has a degree of phosphorylation of from 8 to 20 wt % in terms of phosphorus content.

3. The carbamidated cellulose II phosphate according to claim 1, wherein said reacting is carried out at a temperature of from 100 to 300° C. and for a reaction time of 0.5 to 8 hours.

4. The carbamidated cellulose II phosphate according to claim 1, which is obtained by mixing said urea and said phosphorus oxide, phosphoric acid halide, phosphoric acid or a salt thereof with said dried cellulose II, completely drying the mixture, and then carrying out said reacting at a temperature of from 100 to 300° C. and for a reaction time of 0.5 to 8 hours.

5. A metal-adsorbing system comprising the carbamidated cellulose II phosphate according to claim 1.

6. A metal-adsorbing system according to claim 5, wherein said metal-adsorbing material is packed in a column.

7. A metal-adsorbing system according to claim 5, wherein said metal-adsorbing material is in a form of a bag.

8. A metal-adsorbing system according to claim 5, wherein said metal-adsorbing material is in a form of a cylinder or fabric and is arranged inside a water storage tank.

9. A metal-adsorbing system according to claim 5, wherein the carbamidated cellulose II phosphate has a degree of phosphorylation of from 8 to 20 wt % in terms of phosphorus content.

10. An anion-adsorbing material comprising a metal salt of the carbamidated cellulose II phosphate according to claim 1.

11. An anion-adsorbing material according to claim 10, wherein the carbamidated cellulose II phosphate has a degree of phosphorylation of from 8 to 20 wt % in terms of phosphorus content.

12. A method of adsorbing metal ions in a solution, comprising adsorbing said metal ions using said carbamidated cellulose II phosphate according to claim 1 as a metal-adsorbing material.

13. A method according to claim 12, wherein the carbamidated cellulose II phosphate has a degree of phosphorylation of from 8 to 20 wt % in terms of phosphorus content.

14. A process for producing a carbamidated cellulose II phosphate in which said cellulose II phosphate has a degree of phosphorylation of from 3 to 20 wt % in terms of phosphorus content, which comprises reacting a phosphorus oxide, a phosphoric acid halide, or a phosphoric acid or a salt thereof with a dried cellulose II in the presence of urea.

15. The process for producing a carbamidated cellulose II phosphate according to claim 14, wherein the carbamidated cellulose II phosphate has a degree of phosphorylation of from 8 to 20 wt % in terms of phosphorus content.

16. The process for producing a carbamidated cellulose II phosphate according to claim 15, wherein said reacting is carried out at a temperature of from 100 to 300° C. and for a reaction time of 0.5 to 8 hours.

17. The process according to claim 14, which comprises mixing said urea and said phosphorus oxide, phosphoric acid halide, phosphoric acid or salt thereof with said dried cellulose II, completely drying the mixture, and then carrying out said reacting at a temperature of from 100 to 300° C. and for a reaction time of 0.5 to 8 hours.

* * * * *